United States Patent
Burgoon et al.

(10) Patent No.: US 9,759,279 B2
(45) Date of Patent: Sep. 12, 2017

(54) FLOATING BRAKE DRUM AND HAT ASSEMBLY

(71) Applicant: PERFORMANCE FRICTION CORPORATION, Clover, SC (US)

(72) Inventors: Donald L. Burgoon, Gastonia, NC (US); Darin Cate, York, SC (US); Richard Johns, Cornelius, NC (US); Konan Perez, Lake Wylie, SC (US); Mark Wagner, Weddington, NC (US)

(73) Assignee: PERFORMANCE FRICTION CORPORATION, Clover, SC (US)

( * ) Notice: Subject to any disclaimer, the term of this patent is extended or adjusted under 35 U.S.C. 154(b) by 0 days.

(21) Appl. No.: 14/780,915

(22) PCT Filed: Mar. 27, 2014

(86) PCT No.: PCT/US2014/032065
§ 371 (c)(1),
(2) Date: Sep. 28, 2015

(87) PCT Pub. No.: WO2014/160889
PCT Pub. Date: Oct. 2, 2014

(65) Prior Publication Data
US 2016/0069406 A1 Mar. 10, 2016

Related U.S. Application Data

(60) Provisional application No. 61/805,889, filed on Mar. 27, 2013.

(51) Int. Cl.
*F16D 65/10* (2006.01)
*F16D 65/02* (2006.01)

(52) U.S. Cl.
CPC ........ *F16D 65/10* (2013.01); *F16D 2065/136* (2013.01); *F16D 2065/1316* (2013.01); *F16D 2065/1392* (2013.01)

(58) Field of Classification Search
CPC ...... F16D 65/10; F16D 65/12; F16D 2065/13; F16D 2065/1304; F16D 2065/1392
See application file for complete search history.

(56) References Cited

U.S. PATENT DOCUMENTS 1,947,782 A * 2/1934 Lejeune .................. F16D 65/10
164/333
2,099,833 A * 11/1937 Van Halteren .......... F16D 65/10
188/218 R (Continued)

FOREIGN PATENT DOCUMENTS

EP 1430234 T3 6/2004
EP 2025965 A1 2/2009

OTHER PUBLICATIONS

International Search report and Written Opinion issued in corresponding PCT/US2014/032065 on Jul. 24, 2014.

*Primary Examiner* — Vishal Sahni
(74) *Attorney, Agent, or Firm* — Roberts Mlotkowski Safran Cole & Calderon, P.C.

(57) ABSTRACT

The floating brake drum and hat assembly includes a brake drum (12) having a braking surface (14) and an attachment flange (16), a hat (18) having an outer diameter (20) and a brake drum mounting flange (22) for mounting to the attachment flange (16) of the brake drum, and means for coupling (24) the attachment flange of the brake drum to the brake drum mounting flange of the hat, the means for coupling structured and arranged to allow radial thermal expansion and contraction of at least a portion of the attachment flange of the brake drum and/or at least a portion of the brake drum mounting flange of the hat.

23 Claims, 16 Drawing Sheets

(56) References Cited

U.S. PATENT DOCUMENTS

| | | | | |
|---|---|---|---|---|
| 2,747,902 A | * | 5/1956 | Payne | F16D 65/10 |
| | | | | 188/218 A |
| 5,373,919 A | * | 12/1994 | Siegrist | F16D 53/00 |
| | | | | 188/250 G |
| 6,116,386 A | | 9/2000 | Martin | |
| 2016/0053838 A1 | * | 2/2016 | Burgoon | F16D 65/10 |
| | | | | 188/218 R |

* cited by examiner

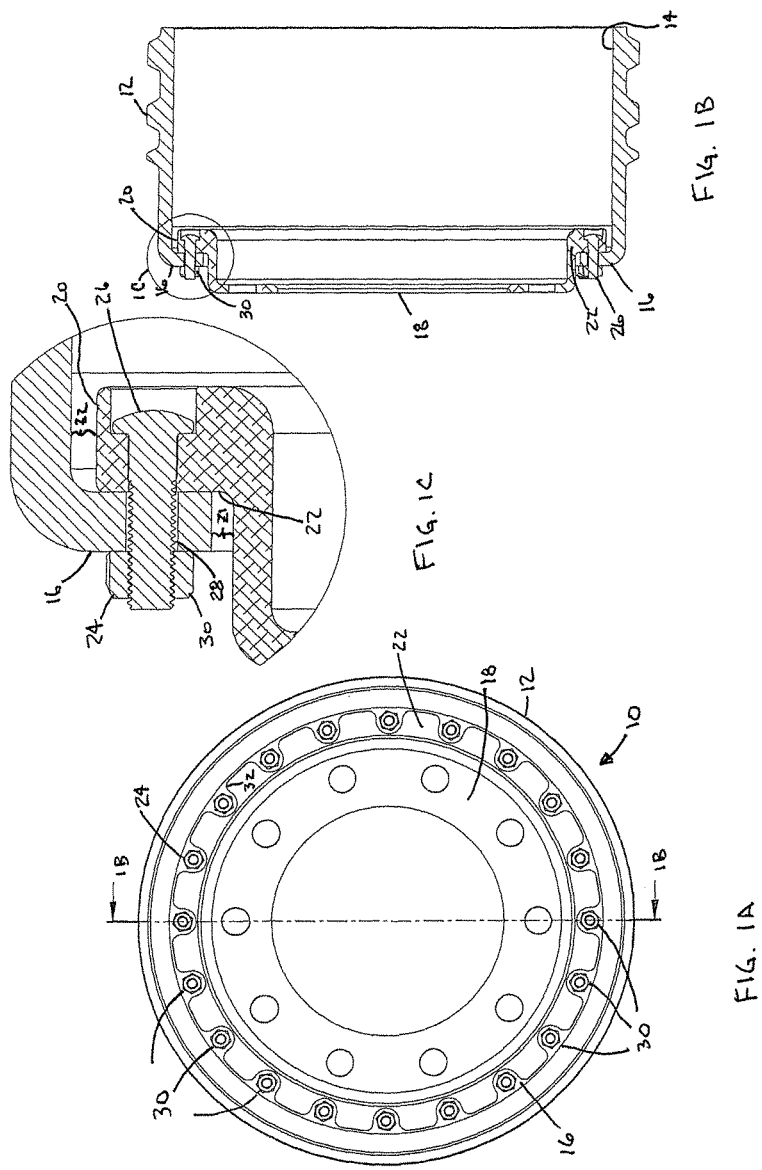

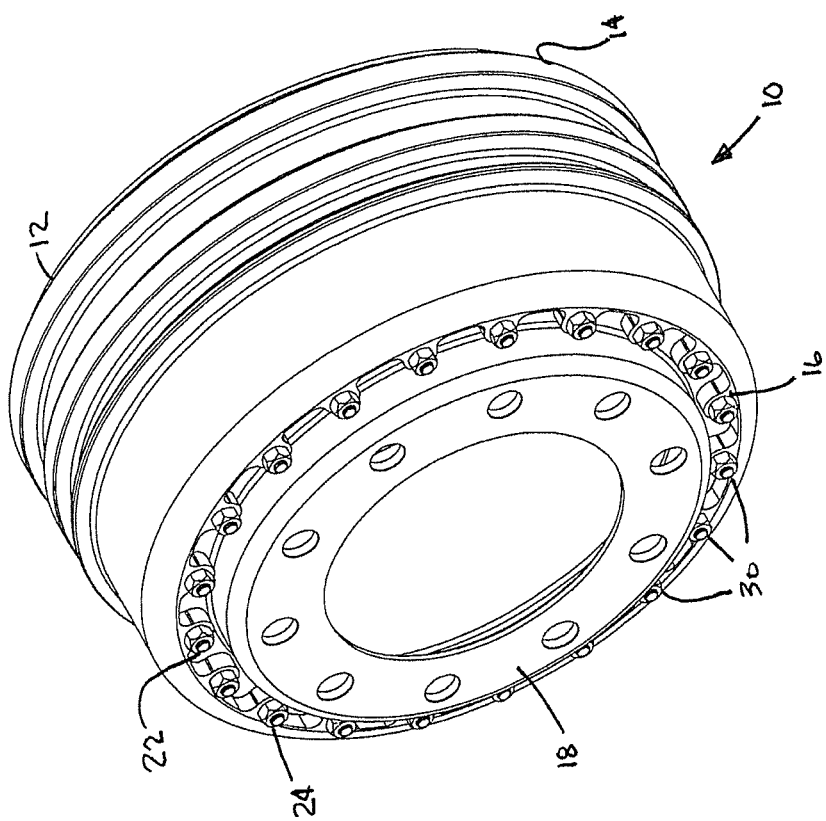

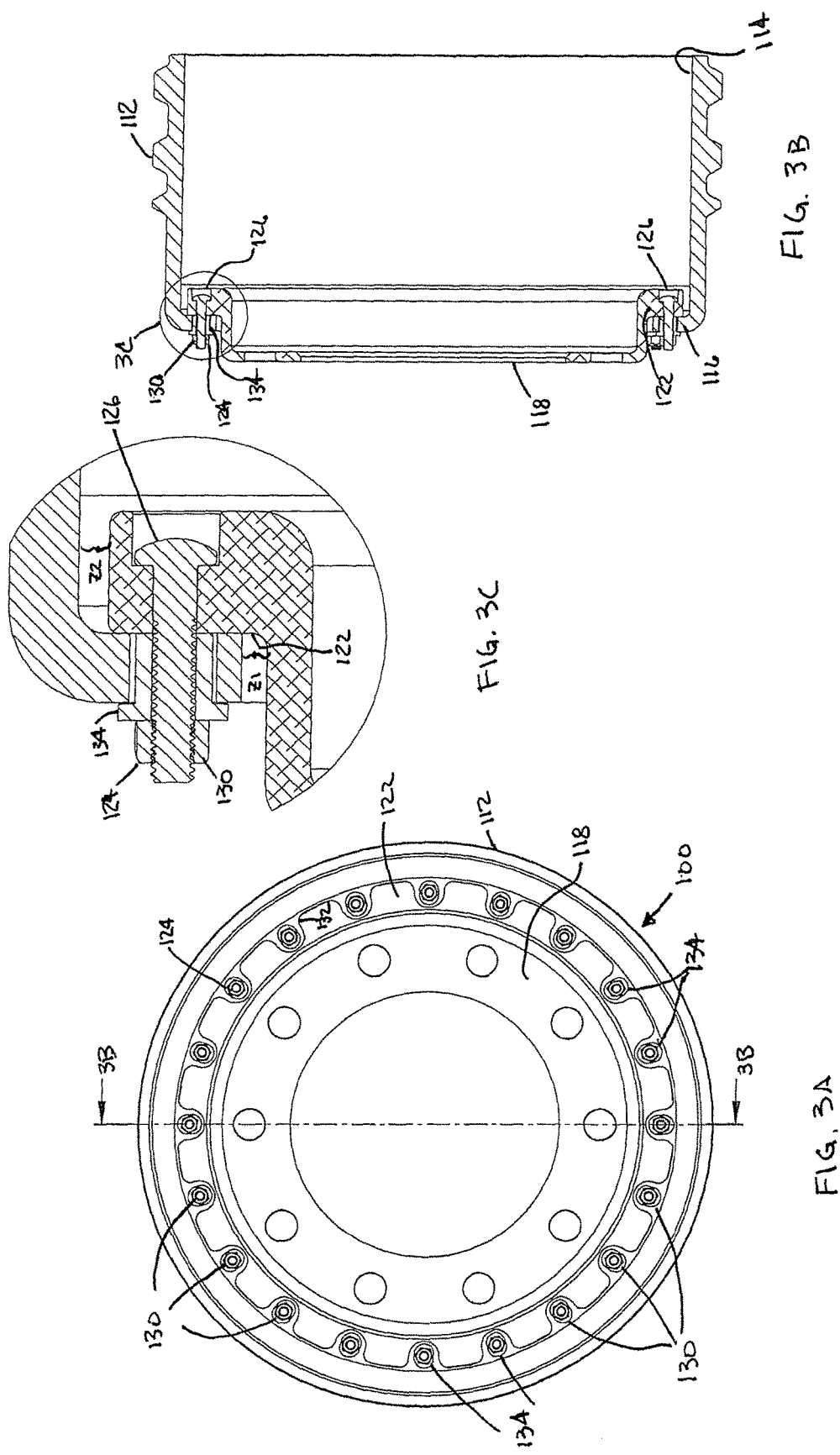

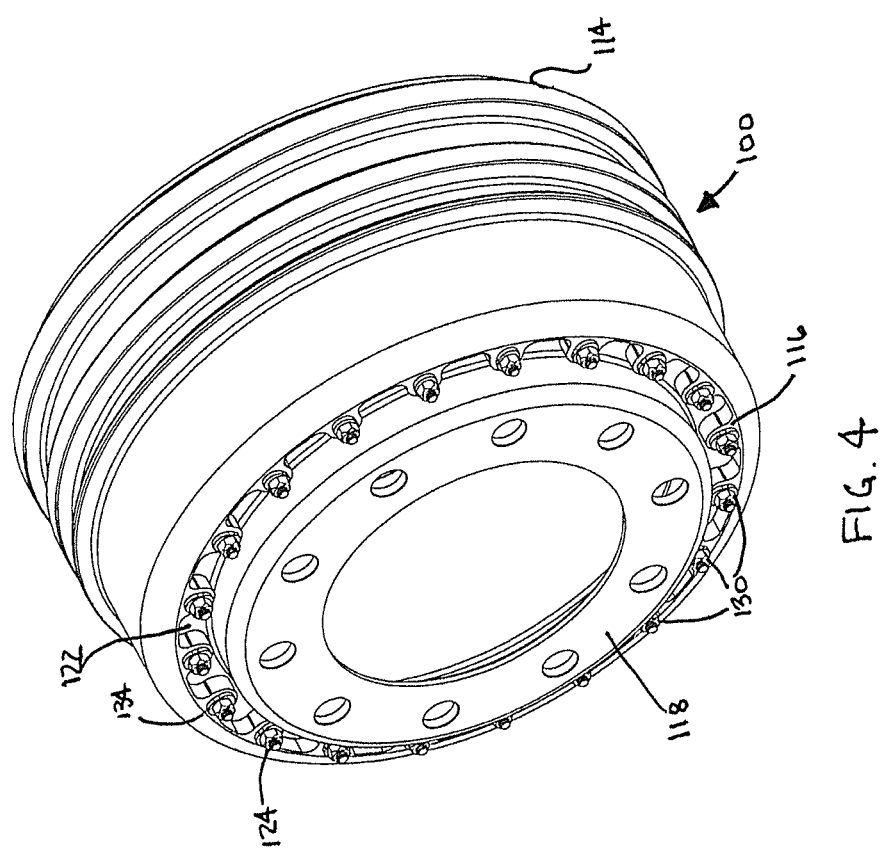

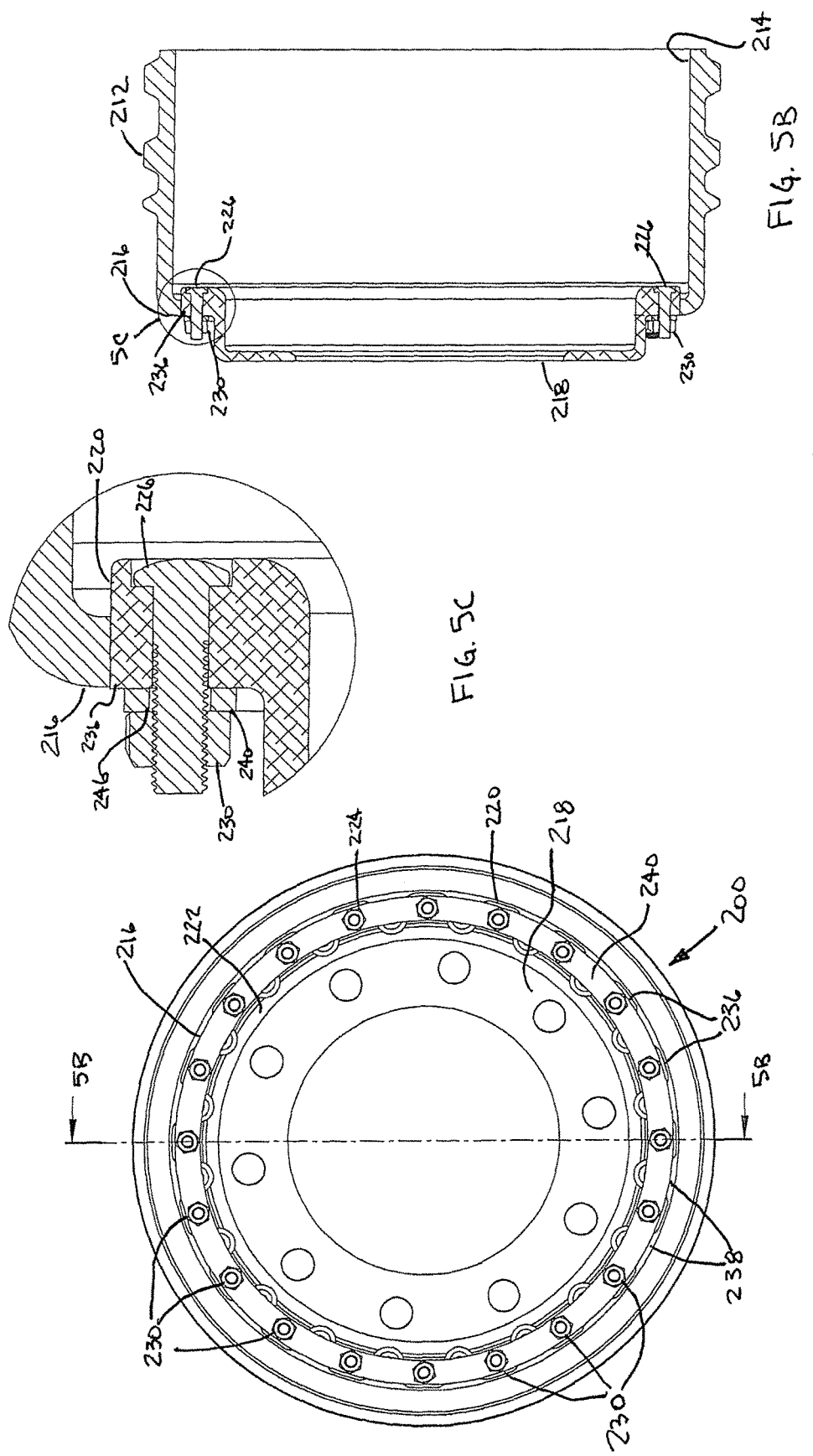

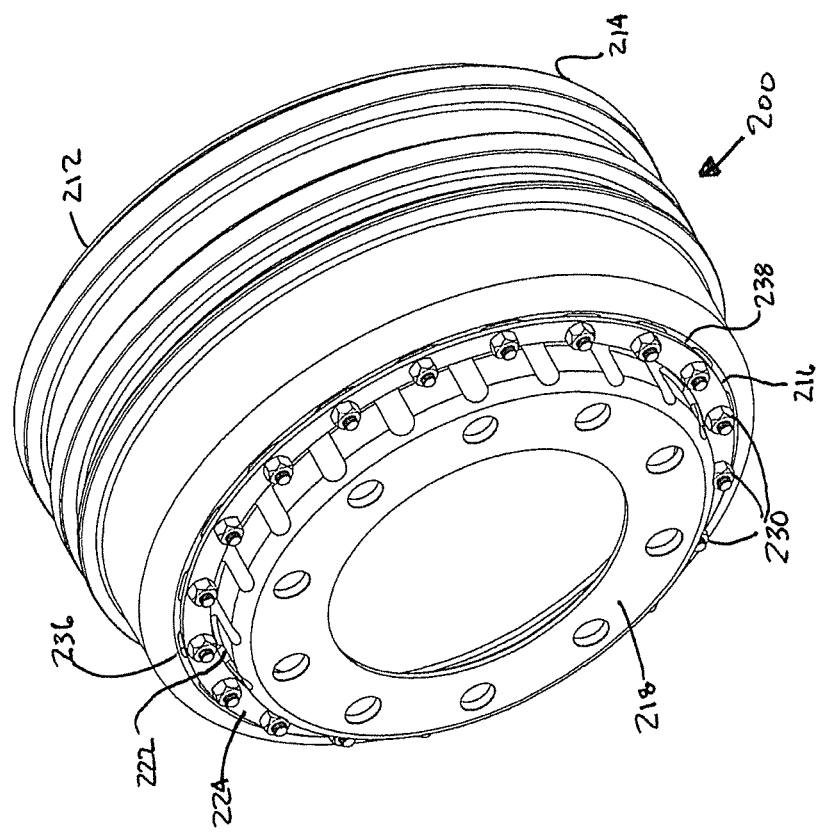

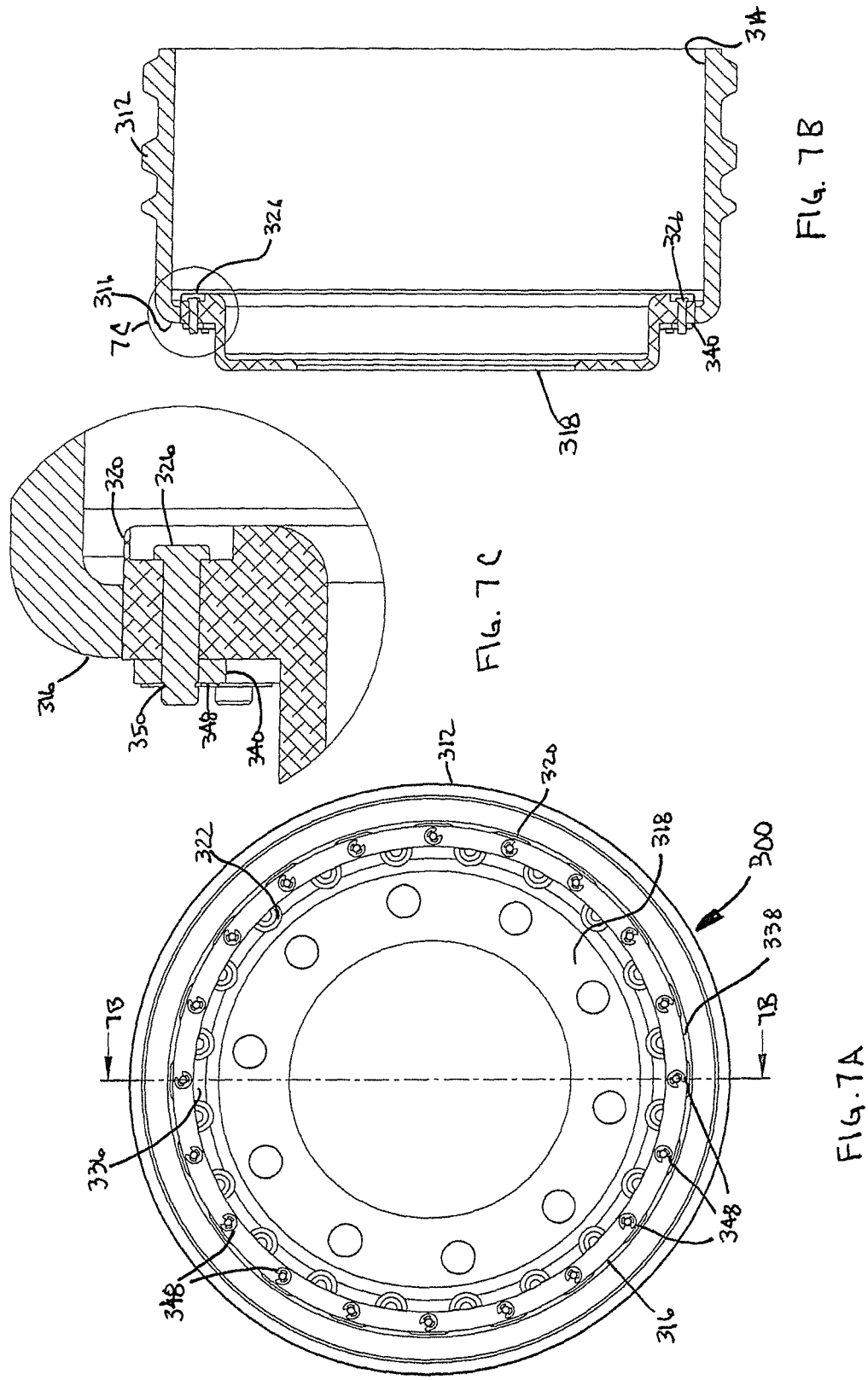

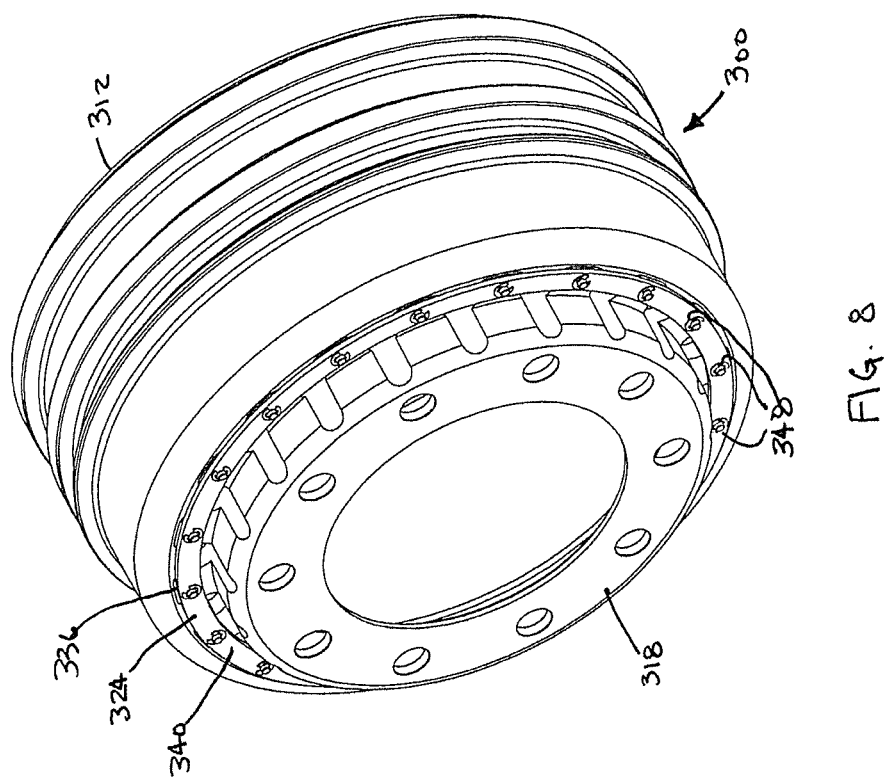

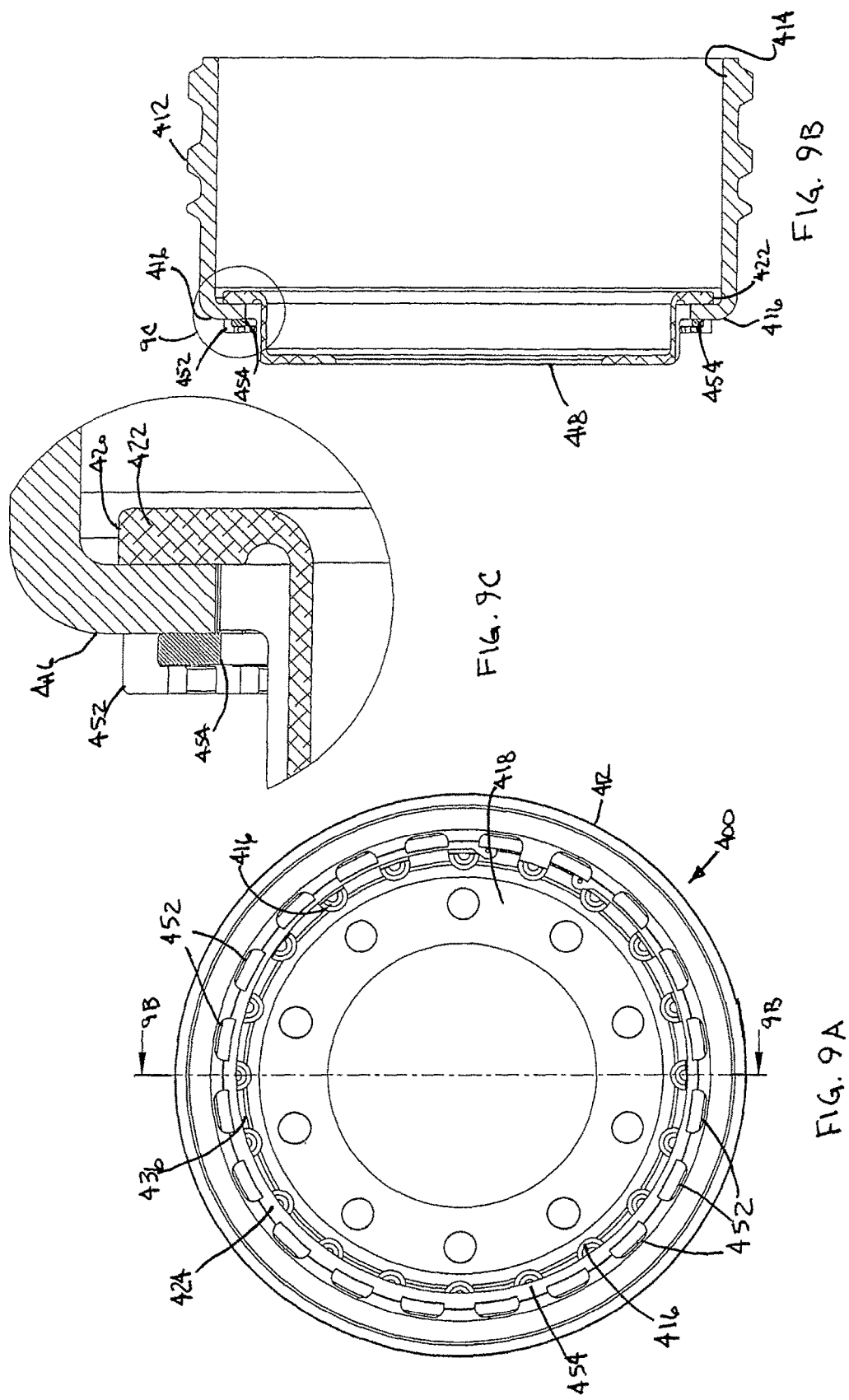

FLOATING BRAKE DRUM AND HAT ASSEMBLY

CROSS-REFERENCE TO RELATED APPLICATIONS

The present application is a U.S. National Phase of PCT/US2014/032065 filed on Mar. 27, 2014 claiming priority to U.S. Provisional application No. 61/805,889 filed Mar. 27, 2013. The disclosure of the PCT Application is hereby incorporated by reference into the present Application.

RELATED APPLICATION

This application claims priority to U.S. Provisional Application Ser. No. 61/805,889, filed on Mar. 27, 2013, the contents of which are hereby incorporated by reference in their entirety.

FIELD

The invention relates to brake assemblies, especially vehicular brakes including drum brakes attached to wheel hats.

BACKGROUND

Drum brakes are used in most heavy duty trucks, some medium and light duty trucks, and a few cars, dirt bikes, and ATVs. In some vehicles, drum brakes are applied to the rear wheels since most of the stopping force is generated by the front brakes of the vehicle and therefore the heat generated by the rear is less.

Due to the fact that a drum brake's friction contact area is at the circumference of the brake, a drum brake can provide more braking force than an equal diameter disc brake. The increased friction contact area of drum brake shoes on the drum allows drum brake shoes to last longer than disc brake pads used in a brake system of similar dimensions and braking force. Drum brakes retain heat and are more complex than disc brakes, but are often the more economical and powerful brake type to use in rear brake applications due to the low heat generation of rear brakes, a drum brake self-applying nature, large friction surface contact area, and long life wear characteristics.

Drum brakes convert kinetic energy into heat by friction. While much of this heat should dissipate into the surrounding air, it can easily transfer to the brake system components. Brake drums must be large to cope with the massive forces involved, and must be able to absorb and dissipate a lot of heat. Excessive heating can occur due to heavy or repeated braking, which can cause the drum to distort, leading to vibration under braking. Another consequence of overheating is brake fade. When the drums are heated by hard braking, the diameter of the drum increases slightly due to thermal expansion, so the shoes must move farther and the driver must press the brake pedal farther.

Conventional drum designs have been known to exhibit non-uniform thermal expansion, which increases brake pulsation and unevenly distributed braking force. Brake judder and vibration are frequently experiences. In certain cases, the high service requirements of large truck drum brakes produce increased and unacceptable levels of drum cracking.

Another issue with regard to conventional drum brake designs stems from the fact that they are heavier than disc brakes, adding significant weight to a vehicle and a corresponding reduction in fuel economy.

In summary, prior art brake drums have suffered from problems associated with wear, heat and material fatigue due to stresses induced during the braking process. It would be desirable to reduce the stresses experienced by brake drums and, to increase performance and durability, while decreasing weight.

There is a need, therefore, to provide a brake drum and wheel hat assembly that reduces or eliminates the aforementioned problems to increase the life and reliability of the brake device, while providing an assembly that is lower in weight.

SUMMARY

In one aspect, provided is a floating brake drum and hat assembly. The floating brake drum and hat assembly includes a brake drum having a braking surface and an attachment flange; a hat having an outer diameter and a brake drum mounting flange for mounting to the attachment flange of the brake drum; and means for coupling the attachment flange of the brake drum to the brake drum mounting flange of the hat, the means for coupling structured and arranged to allow radial thermal expansion and contraction of at least a portion of the attachment flange of the brake drum and/or at least a portion of the brake drum mounting flange of the hat. A method of making a floating brake drum and hat assembly is also provided.

In some embodiments, the brake drum mounting flange of the hat comprises a plurality of threaded brake drum mounting studs and the attachment flange of the brake drum comprises a plurality of corresponding holes.

In some embodiments, the means for coupling comprises a plurality of threaded nuts for threading onto the threaded brake drum mounting studs and forming the assembly.

In some embodiments, the brake drum attachment flange is scalloped to reduce material and provide space for thermal expansion.

In some embodiments, the outer diameter of the hat is sized to provide space for thermal expansion.

In some embodiments, the assembly further comprises a plurality of grommets for mounting within the holes the attachment flange of the brake drum, the plurality of grommets are structured and arranged to provide a degree of thermal isolation between the attachment flange of the brake drum and the brake drum mounting flange of the hat. In some embodiments, the plurality of grommets are structured and arranged to provide additional space for thermal expansion of the attachment flange of the brake drum.

In some embodiments, the attachment flange of the brake drum has a plurality of brake drum tabs.

In some embodiments, the brake drum mounting flange of the hat comprises a plurality of hat tabs for engagement with the brake drum tabs.

In some embodiments, each of the plurality of hat tabs of the brake drum mounting flange further comprises a threaded hold-down ring mounting stud.

In some embodiments, the means for coupling comprises a hold-down ring, the hold-down ring having a plurality of holes to correspond with the threaded hold-down ring mounting studs and a plurality of threaded nuts for threading onto the threaded hold-down ring mounting studs and forming the assembly. In some embodiments, the means for coupling further comprises a plurality of spacers for placing over the threaded hold-down ring mounting studs and under the hold-down ring to isolate the brake drum tabs from the hold-down ring.

In some embodiments, the means for coupling further comprises a plurality of biasing members for placing onto the brake drum tabs and under the hold-down ring to preload the brake drum tabs.

In some embodiments, each of the plurality of hat tabs of the brake drum mounting flange further comprises an unthreaded hold-down ring mounting stud.

In some embodiments, the means for coupling comprises a hold-down ring, the hold-down ring having a plurality of holes to correspond with the unthreaded hold-down ring mounting studs and a plurality of lock rings for engaging grooves on the unthreaded hold-down ring mounting studs and forming the assembly.

In some embodiments, the means for coupling further comprises a plurality of spacers for placing over the unthreaded hold-down ring mounting studs and under the hold-down ring to isolate the brake drum tabs from the hold-down ring.

In some embodiments, each of the plurality of hat tabs of the brake drum mounting flange further comprises a flange projection extending in an axial direction and in a radial direction so as to form a plurality of flange projections adapted to receive a snap ring.

In some embodiments, the snap ring is in the form of a multiple turn spiral ring.

In some embodiments, each flange projection extends in an axial direction at the circumferential edge of hat tab and in a radially inward direction, providing an annular aperture, adapted for radially outward and axial-directed constrained seating of the snap ring.

In some embodiments, each flange projection extends in an axial direction at the circumferential edge of hat tab and in a radially outward direction, providing an annular aperture, adapted for radially inward and axial-directed constrained seating of the snap ring.

In some embodiments, further comprising at least one pin for securing the snap ring to the hat.

In some embodiments, the brake drum is attached to a hat without a radial flange that overlaps the wheel mounting face. In some embodiments, the brake drum is attached to a hat with a radial flange of less than 45 mm. In some embodiments, the brake drum is attached to a hat with one or more retaining clips or plates. In some embodiments, the brake drum is attached with a taper on the spring ring for preloading.

In another aspect, a method of making a floating brake drum and hat assembly is provided. The method includes the steps of providing a brake drum having a braking surface and an attachment flange; providing a hat having an outer diameter and a brake drum mounting flange for mounting to the attachment flange of the brake drum; and coupling the attachment flange of the brake drum to the brake drum mounting flange of the hat by providing a means for coupling structured and arranged to allow radial thermal expansion and contraction of at least a portion of the attachment flange of the brake drum and/or at least a portion of the brake drum mounting flange of the hat.

These and other aspects of the invention will become apparent in view of the detailed description and drawings herein.

BRIEF DESCRIPTION OF THE DRAWINGS

The invention is described in conjunction with the following drawings in which like reference numerals designate like elements and wherein:

FIG. 1A is a front plan view of a floating brake drum and hat assembly in accordance with an embodiment of the invention;

FIG. 1B is a side view in cross section of FIG. 1A taken along line 1A-1A;

FIG. 1C is an enlarged view of section 1C of FIG. 1B;

FIG. 2 is a perspective view of the embodiment of FIGS. 1A-1C;

FIG. 3A is a front plan view of a floating brake drum and hat assembly in accordance with another embodiment of the invention;

FIG. 3B is a side view in cross section of FIG. 3A taken along line 3A-3A;

FIG. 3C is an enlarged view of section 3C of FIG. 3B;

FIG. 4 is a perspective view of the embodiment of FIGS. 3A-3C;

FIG. 6 is a perspective view of the embodiment of FIGS. 5A-5C;

FIG. 8 is a perspective view of the embodiment of FIGS. 7A-7C;

FIG. 9A is a front plan view of a floating brake drum and hat assembly in accordance with an embodiment of the invention;

FIG. 9B is a side view in cross section of FIG. 9A taken along line 9A-9A;

FIG. 9C is an enlarged view of section 9C of FIG. 9B;

DETAILED DESCRIPTION

Figure 5D:
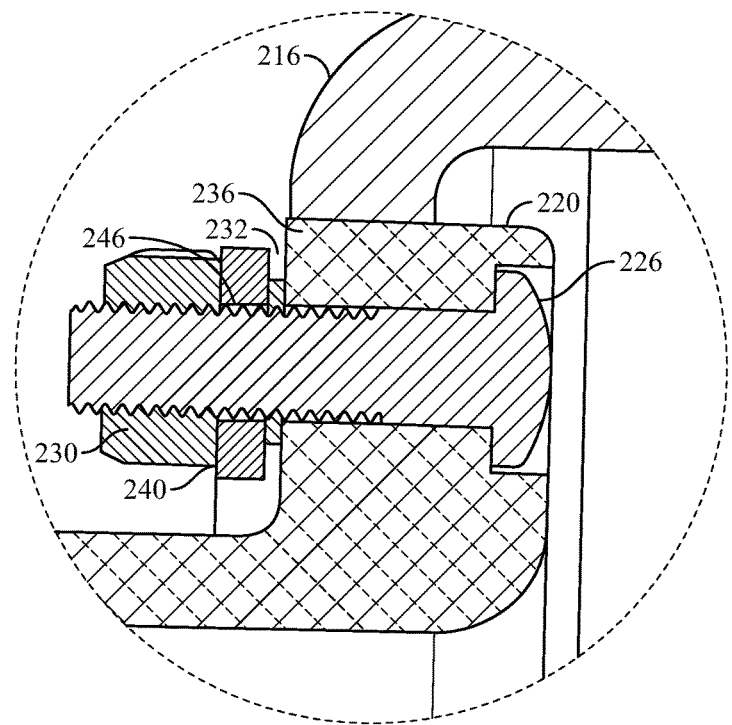
FIG. 5A is a front plan view of a floating brake drum and hat assembly in accordance with another embodiment of the invention.
FIG. 5B is a side view in cross section of FIG. 5A taken along line 5A-5A.
FIG. 5C is an enlarged view of section 5C of FIG. 5B, and FIGS. 5D and 5E show alternative embodiments of FIG. 5C.

The brake assembly 10 seen in FIG. 1A is preferred for use on vehicles, including automobiles, racing vehicles, trucks, heavy duty trucks, motorcycles and the like. The vehicles suitable for use with this invention can include those vehicles having a gross vehicle weight of less than about 5,000 pounds, a gross vehicle weight of about 5,000 pounds to 12,000 pounds, and a gross vehicle weight of more than about 12,000 pounds, for example 30,000 pounds. However, the inventive concepts discussed herein can be used in any type of application that uses rotary brakes, including automotive, other types of motorized vehicles, or railcars.

Referring now to FIGS. 1A-C and 2, a floating brake drum and hat assembly 10, in accordance herewith, is depicted. The floating brake drum and hat assembly 10 includes a brake drum 12 having a braking surface 14 and an attachment flange 16. Floating brake drum and hat assembly 10 also includes a hat 18 having an outer diameter 20 and a brake drum mounting flange 22 for mounting to attachment flange 16 of brake drum 12. Brake drum 12 may be made of cast iron, as those skilled in the art will recognize. For example, a suitable material would be Class 35 cast iron, which has a tensile strength of about 35 ksi and a yield strength of about 28 ksi. Hat 18 can be made of cast iron, like the brake drum 12, or if desired, a material having a lower hardness, such as aluminum, may be used.

To form floating brake drum and hat assembly 10, means for coupling the attachment flange of the brake drum to the brake drum mounting flange of the hat 24 are provided. As shown, brake drum mounting flange 22 of hat 18 includes a plurality of threaded brake drum mounting studs 26. Correspondingly, attachment flange 16 of brake drum 12 is provided with a plurality of holes 28 for mounting brake drum 12 over the plurality of threaded brake drum mounting studs 26 of hat 18. In the embodiment depicted in FIGS. 1A-C and 2 means for coupling 24 includes a plurality of threaded nuts 30 for threading onto threaded brake drum mounting studs 26 and forming the assembly 10.

As will be appreciated by those skilled in the art upon a review of FIGS. 1A-C and 2 and the discussion below, means for coupling 24 is structured and arranged to allow for radial thermal expansion and contraction of at least a portion of the attachment flange 16 of the brake drum 12 and/or at least a portion of the brake drum mounting flange 22 of the hat 18. Advantageously, in some embodiments, brake drum attachment flange 16 may be provided with a plurality of scallops 32 to reduce material and provide space or zone Z1 for thermal expansion. In some embodiments, the outer diameter 20 of hat 18 is sized to provide a space or zone Z2 for thermal expansion.

Referring now to FIGS. 3A-C and 4, a floating brake drum and hat assembly 100, in accordance herewith, is depicted. The floating brake drum and hat assembly 100 includes a brake drum 112 having a braking surface 114 and an attachment flange 116. Floating brake drum and hat assembly 100 also includes a hat 118 having an outer diameter 120 and a brake drum mounting flange 122 for mounting to attachment flange 116 of brake drum 112. As detailed above, brake drum 112 may be made of cast iron, as those skilled in the art will recognize. For example, a suitable material would be Class 35 cast iron, which has a tensile strength of about 35 ksi and a yield strength of about 28 ksi. Hat 118 can be made of cast iron, like the brake drum 112, or if desired, a material having a lower hardness, such as aluminum, may be used.

To form floating brake drum and hat assembly 100, means for coupling the attachment flange of the brake drum to the brake drum mounting flange of the hat 124 are provided. As shown, brake drum mounting flange 122 of hat 118 includes a plurality of threaded brake drum mounting studs 126. Correspondingly, attachment flange 116 of brake drum 112 is provided with a plurality of holes 128 for mounting brake drum 112 over the plurality of threaded brake drum mounting studs 126 of hat 118. In the embodiment depicted in FIGS. 3A-C and 4 means for coupling 124 includes a plurality of threaded nuts 130 for threading onto threaded brake drum mounting studs 126 and forming the assembly 100.

As will be appreciated by those skilled in the art upon a review of FIGS. 3A-C and 4 and the discussion below, means for coupling 124 is structured and arranged to allow for radial thermal expansion and contraction of at least a portion of the attachment flange 116 of the brake drum 112 and/or at least a portion of the brake drum mounting flange 122 of the hat 118. Advantageously, in some embodiments, brake drum attachment flange 116 may be provided with a plurality of scallops 132 to reduce material and provide space or zone Z1 for thermal expansion. In some embodiments, the outer diameter 120 of hat 118 is sized to provide a space or zone Z2 for thermal expansion.

As shown in FIGS. 3A-C and 4, assembly 100 also includes a plurality of grommets 134 for mounting within the holes 128 of attachment flange 116 of brake drum 112. In some embodiments, the plurality of grommets 134 may be structured and arranged to provide a degree of thermal isolation between attachment flange 116 of brake drum 112 and brake drum mounting flange 112 of hat 118. In some embodiments, the plurality of grommets 134 may be structured and arranged to provide an additional space or zone for thermal expansion of attachment flange 116 of brake drum 112. Grommets 134 may be produced from a wide variety of materials, including metals, such as steel or aluminum, or polymeric materials, depending upon the service to be encountered.

Figure 5E:
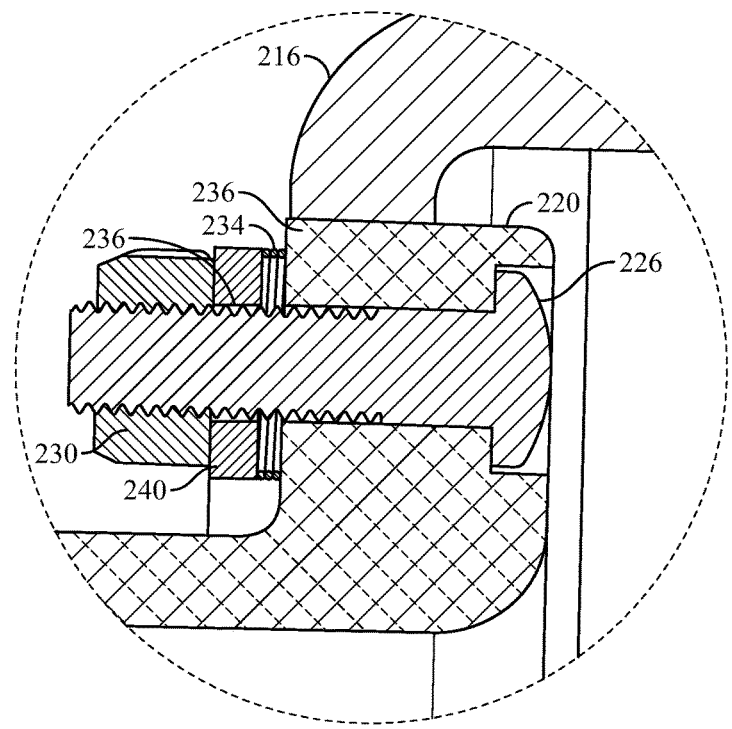

Referring now to FIGS. 5A-E and 6, a floating brake drum and hat assembly 200, in accordance herewith, is depicted. The floating brake drum and hat assembly 200 includes a brake drum 212 having a braking surface 214 and an attachment flange 216. Floating brake drum and hat assembly 200 also includes a hat 218 having an outer diameter 220 and a brake drum mounting flange 222 for mounting to attachment flange 216 of brake drum 212. As detailed above, brake drum 212 may be made of cast iron, as those skilled in the art will recognize. For example, a suitable material would be Class 35 cast iron, which has a tensile strength of about 35 ksi and a yield strength of about 28 ksi. Hat 218 can be made of cast iron, like the brake drum 212, or if desired, a material having a lower hardness, such as aluminum, may be used.

To form floating brake drum and hat assembly 200, means for coupling the attachment flange of the brake drum to the brake drum mounting flange of the hat 224 are provided. As shown, brake drum mounting flange 222 of hat 218 includes a plurality of hat tabs 236. In some embodiments, each hat tabs 236 includes a threaded hold-down ring mounting stud 226. Correspondingly, attachment flange 216 of brake drum 212 is provided with a plurality of brake drum tabs 238 for engagement with the hat tabs 236. In the embodiment depicted in FIGS. 5A-C and 6 means for coupling 224 includes a hold-down ring 240, the hold-down ring having a plurality of holes 246 spaced about so as to correspond with threaded hold-down ring mounting studs 226 and a plurality of threaded nuts 230 for threading onto threaded hold-down ring mounting studs 226 and forming the assembly 200.

As will be appreciated by those skilled in the art, upon a review of FIGS. 5A-C and 6 and the discussion below, means for coupling 224 is structured and arranged to allow for radial thermal expansion and contraction of at least a portion of the attachment flange 216 of the brake drum 212 and/or at least a portion of the brake drum mounting flange 222 of the hat 218.

In some embodiments, means for coupling 224 may further include a plurality of biasing members 234 (FIG. 5E) for placing onto the brake drum tabs 238 to preload brake drum tabs 238. In some embodiments, a plurality of spacers 232 (FIG. 5D) for placing over the threaded hold-down ring mounting studs 226 and under the hold-down ring 240 may thermally isolate brake drum tabs 238 from hold-down ring 240.

Figure 7D:
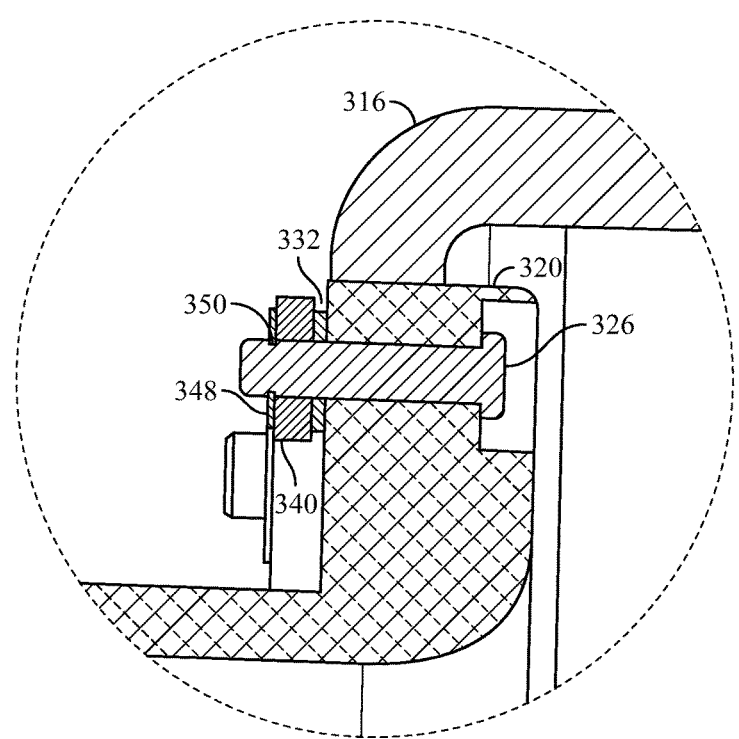
FIG. 7A is a front plan view of a floating brake drum and hat assembly in accordance with another embodiment of the invention.
FIG. 7B is a side view in cross section of FIG. 7A taken along line 7A-7A.
FIG. 7C is an enlarged view of section 7C of FIG. 7B, and FIGS. 7D and 7E show alternative embodiments of FIG. 7C.
Figure 7E:
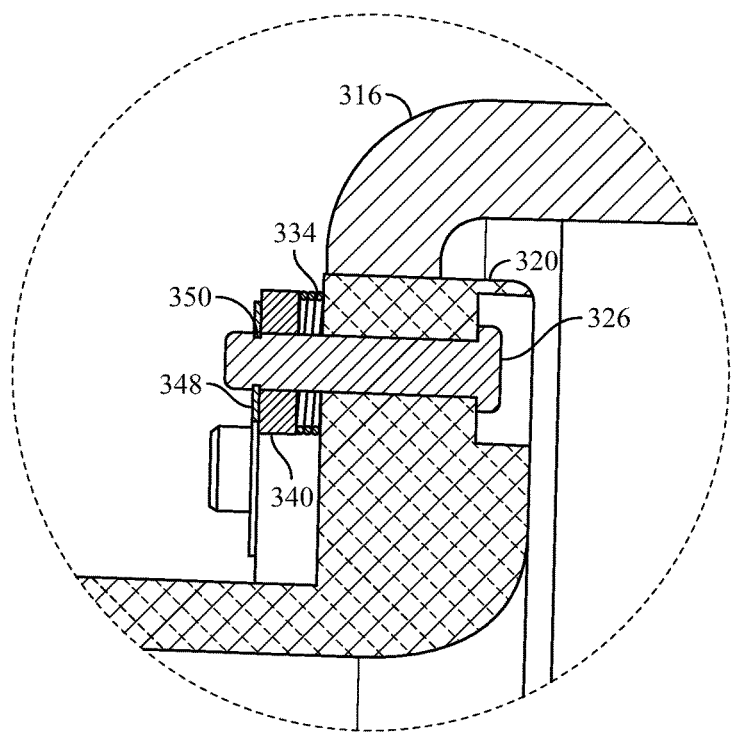

Referring now to FIGS. 7A-E and 8, a floating brake drum and hat assembly 300, in accordance herewith, is depicted. The floating brake drum and hat assembly 300 includes a brake drum 312 having a braking surface 314 and an attachment flange 316. Floating brake drum and hat assembly 300 also includes a hat 318 having an outer diameter 320 and a brake drum mounting flange 322 for mounting to attachment flange 316 of brake drum 312. As detailed above, brake drum 312 may be made of cast iron, as those skilled in the art will recognize. For example, a suitable material would be Class 35 cast iron, which has a tensile strength of about 35 ksi and a yield strength of about 28 ksi. Hat 318 can be made of cast iron, like the brake drum 312, or if desired, a material having a lower hardness, such as aluminum, may be used.

To form floating brake drum and hat assembly 300, means for coupling the attachment flange of the brake drum to the brake drum mounting flange of the hat 324 are provided. As shown, brake drum mounting flange 322 of hat 318 includes a plurality of hat tabs 336. In some embodiments, each hat tab 336 includes an unthreaded hold-down ring mounting stud 326. Correspondingly, attachment flange 316 of brake drum 312 is provided with a plurality of brake drum tabs 338 for engagement with the hat tabs 336. In the embodiment depicted in FIGS. 7A-C and 8 means for coupling 324 includes a hold-down ring 340, the hold-down ring having a plurality of holes 346 spaced about so as to correspond with unthreaded hold-down ring mounting studs 326 and a plurality of lock rings 348 for engaging grooves 350 on the unthreaded hold-down ring mounting studs 326 and forming the assembly 300.

As will be appreciated by those skilled in the art, upon a review of FIGS. 7A-C and 8 and the discussion below, means for coupling 324 is structured and arranged to allow for radial thermal expansion and contraction of at least a portion of the attachment flange 316 of the brake drum 312 and/or at least a portion of the brake drum mounting flange 322 of the hat 318.

In some embodiments, means for coupling 324 may further include a plurality of biasing members 334 (FIG. 7E) for placing onto the brake drum tabs 338 to preload brake drum tabs 338. In some embodiments, a plurality of spacers 332 (FIG. 7D) for placing over the threaded hold-down ring mounting studs 326 and under the hold-down ring 340 may thermally isolate brake drum tabs 338 from hold-down ring 340.

Figure 10:
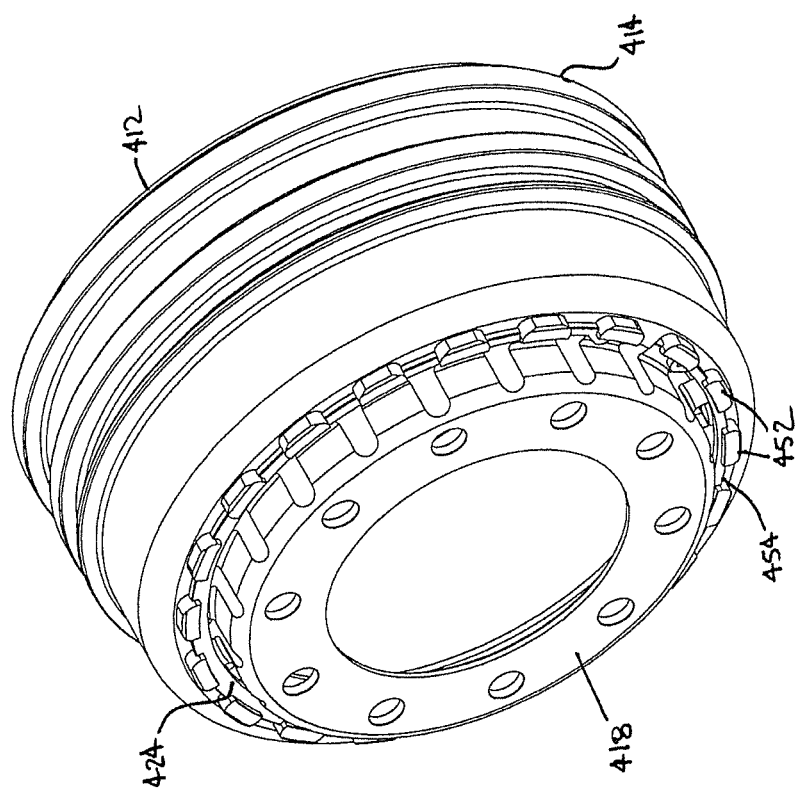
FIG. 10 is a perspective view of the embodiment of FIGS. 9A-9C.

Referring now to FIGS. 9A-C and 10, a floating brake drum and hat assembly 400, in accordance herewith, is depicted. The floating brake drum and hat assembly 400 includes a brake drum 412 having a braking surface 414 and an attachment flange 416. Floating brake drum and hat assembly 400 also includes a hat 418 having an outer diameter 420 and a brake drum mounting flange 422 for mounting to attachment flange 416 of brake drum 412. As detailed above, brake drum 412 may be made of cast iron, as those skilled in the art will recognize. For example, a suitable material would be Class 35 cast iron, which has a tensile strength of about 35 ksi and a yield strength of about 28 ksi. Hat 418 can be made of cast iron, like the brake drum 412, or if desired, a material having a lower hardness, such as aluminum, may be used.

To form floating brake drum and hat assembly 400, means for coupling the attachment flange of the brake drum to the brake drum mounting flange of the hat 424 are provided. As shown, brake drum mounting flange 422 of hat 418 includes a plurality of hat tabs 436. In some embodiments, each hat tab 436 includes a flange projection 452 extending in an axial direction and in a radial direction so as to form a plurality of flange projections 452 adapted to receive a snap ring 454. Attachment flange 416 of brake drum 412 is provided with a plurality of brake drum tabs 438 for engagement with the hat tabs 436. In the embodiment depicted in FIGS. 9A-C and 10, means for coupling 424 includes snap ring 454 for engaging the plurality of flange projections 452 and forming the assembly 400. As shown in FIGS. 9A-C and 10, each flange projection 452 extends in an axial direction at the circumferential edge of each hat tab 436 and in a radially inward direction, providing an annular aperture, adapted for radially outward and axial-directed constrained seating of snap ring 454. In some embodiments, snap ring 454 is configured in the form of a multiple turn spiral ring. As may be appreciated, this form enables the snap ring 454 to be made so that its two ends are not adjacent each other, making for a more secure engagement.

As will be appreciated by those skilled in the art, upon a review of FIGS. 9A-C and 10 and the discussion below, means for coupling 424 is structured and arranged to allow for radial thermal expansion and contraction of at least a portion of the attachment flange 416 of the brake drum 412 and/or at least a portion of the brake drum mounting flange 422 of the hat 418.

Figure 11:
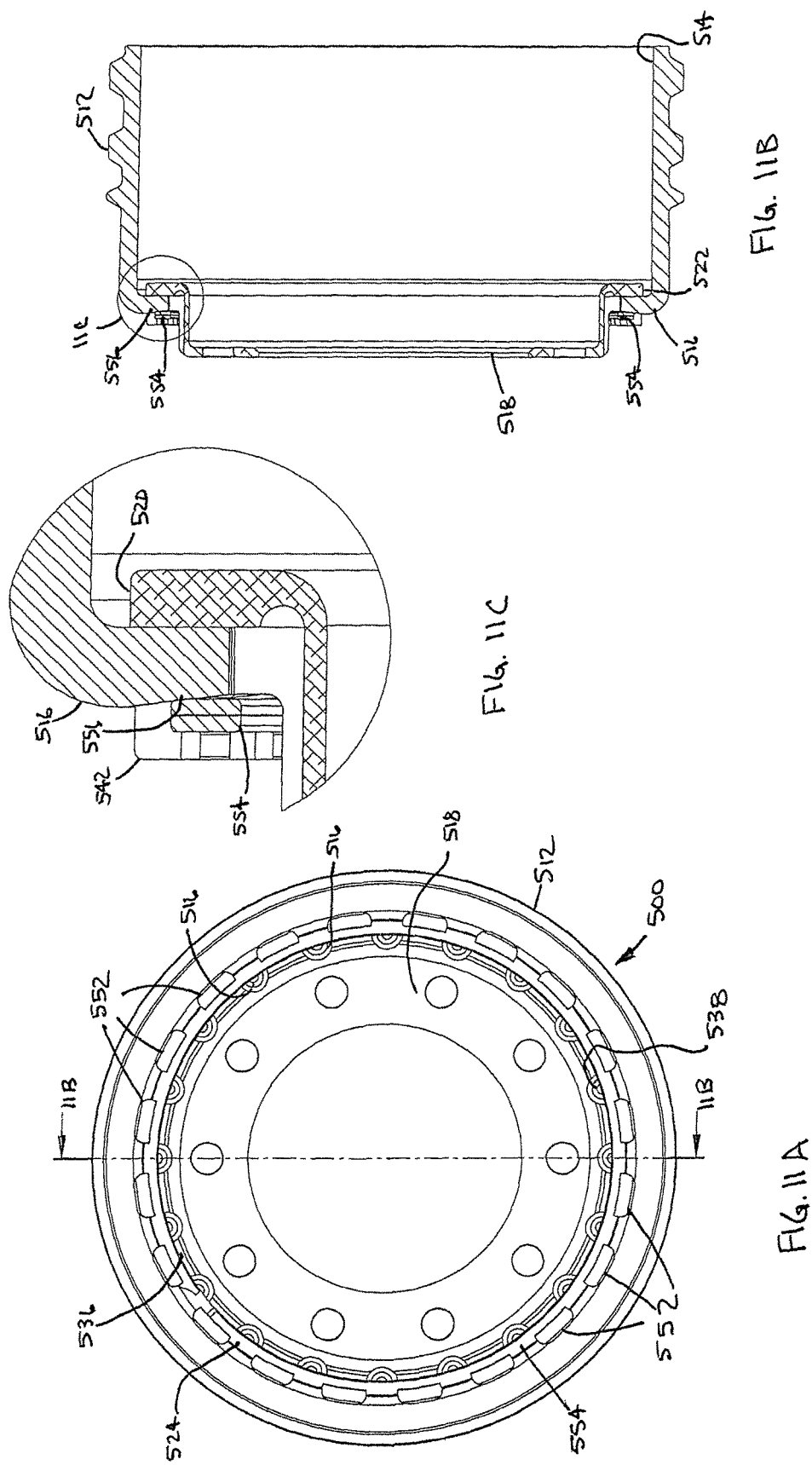
FIG. 11A is a front plan view of a floating brake drum and hat assembly in accordance with another embodiment of the invention.
FIG. 11B is a side view in cross section of FIG. 11A taken along line 11A-11A.
FIG. 11C is an enlarged view of section 11C of FIG. 11B.
Figure 12:
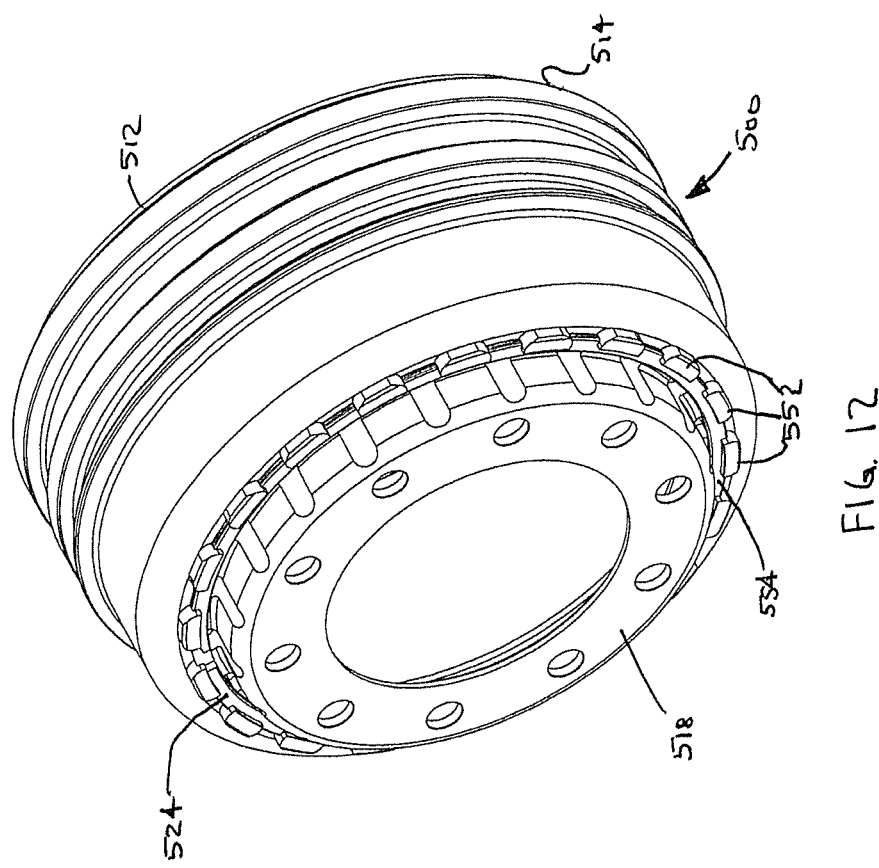
FIG. 12 is a perspective view of the embodiment of FIGS. 11A-11C.

Referring now to FIGS. 11A-C and 12, a floating brake drum and hat assembly 500, in accordance herewith, is depicted. The floating brake drum and hat assembly 500 includes a brake drum 512 having a braking surface 514 and an attachment flange 516. Floating brake drum and hat assembly 500 also includes a hat 518 having an outer diameter 520 and a brake drum mounting flange 522 for mounting to attachment flange 516 of brake drum 512. As detailed above, brake drum 512 may be made of cast iron, as those skilled in the art will recognize. For example, a suitable material would be Class 35 cast iron, which has a tensile strength of about 35 ksi and a yield strength of about 28 ksi. Hat 518 can be made of cast iron, like the brake drum 512, or if desired, a material having a lower hardness, such as aluminum, may be used.

To form floating brake drum and hat assembly 500, means for coupling the attachment flange of the brake drum to the brake drum mounting flange of the hat 524 are provided. As shown, brake drum mounting flange 522 of hat 518 includes a plurality of hat tabs 536. In some embodiments, each hat tab 536 includes a flange projection 552 extending in an axial direction and in a radial direction so as to form a plurality of flange projections 552 adapted to receive a snap ring 554. Attachment flange 516 of brake drum 512 is provided with a plurality of brake drum tabs 538 for engagement with the hat tabs 536. In the embodiment depicted in FIGS. 11A-C and 12, means for coupling 524 includes snap ring 554 for engaging the plurality of flange projections 552 and forming the assembly 500. As shown in FIGS. 11A-C and 12, each flange projection 552 extends in an axial direction at the circumferential edge of each hat tab 536 and in a radially inward direction, providing an annular aperture, adapted for radially outward and axial-directed constrained seating of snap ring 554. In some embodiments, snap ring 554 is configured in the form of a multiple turn spiral ring. As may be appreciated, this form enables the snap ring 554 to be made so that its two ends are not adjacent each other, making for a more secure engagement.

As will be appreciated by those skilled in the art, upon a review of FIGS. 11A-C and 12 and the discussion below, means for coupling 524 is structured and arranged to allow for radial thermal expansion and contraction of at least a portion of the attachment flange 516 of the brake drum 512 and/or at least a portion of the brake drum mounting flange 522 of the hat 518.

In the embodiment depicted in FIGS. 11A-C and 12, brake drum tabs 538 are provided with a tapered surface 556. This serves to preload brake drum tabs 538 against snap ring 554, reducing unwanted noise and chatter associated with a looser fit.

Figure 13:
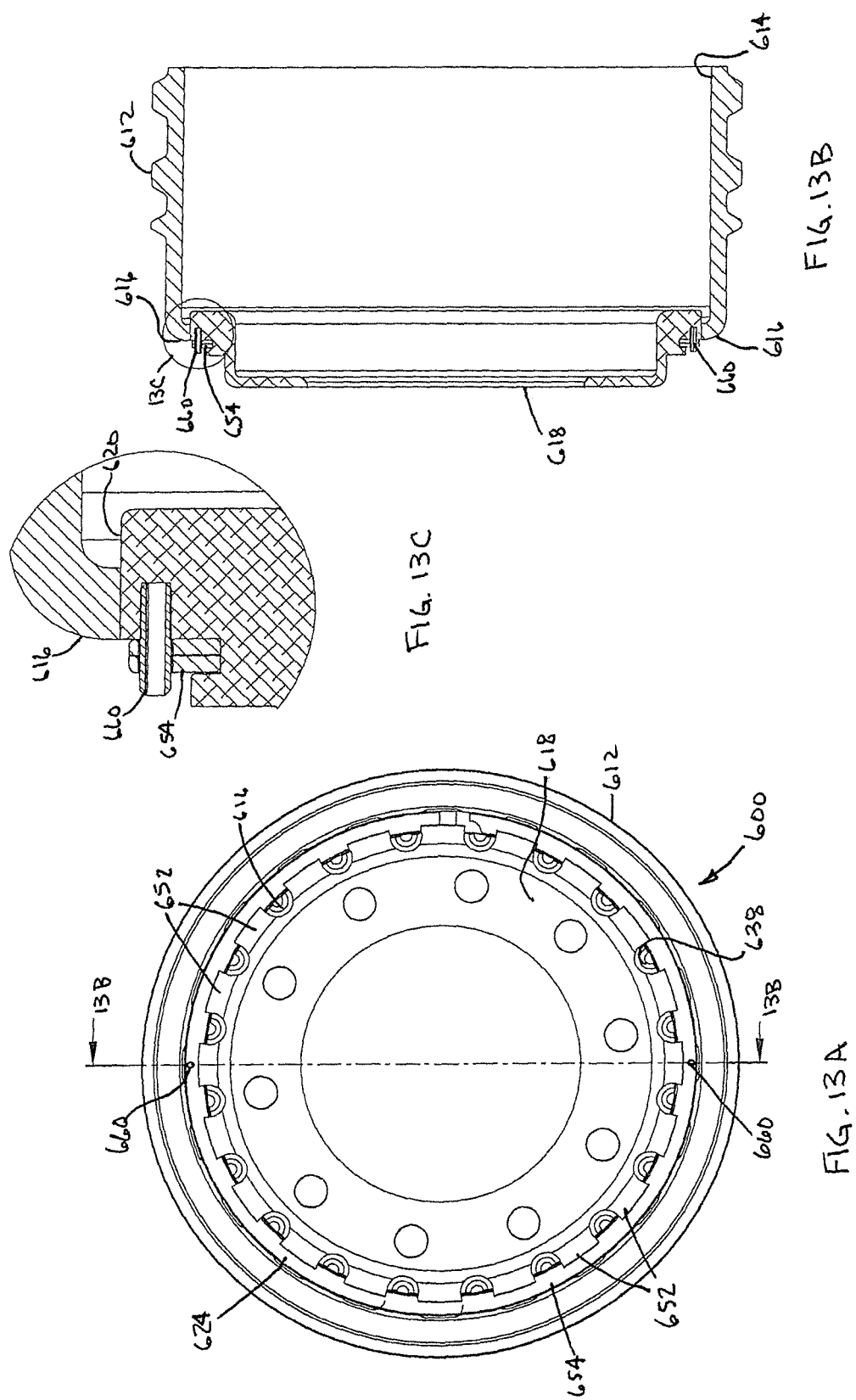
FIG. 13A is a front plan view of a floating brake drum and hat assembly in accordance with another embodiment of the invention.
FIG. 13B is a side view in cross section of FIG. 13A taken along line 13A-13A.
FIG. 13C is an enlarged view of section 13C of FIG. 13B.
Figure 14:
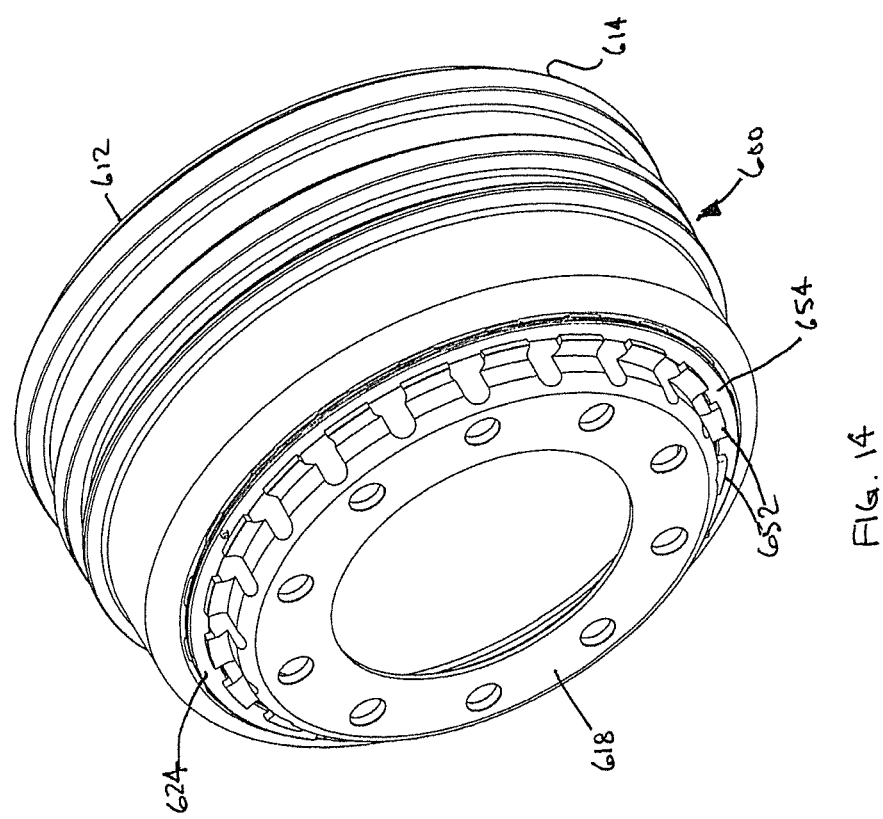
FIG. 14 is a perspective view of the embodiment of FIGS. 13A-13C.

Finally, referring now to FIGS. 13A-C and 14, a floating brake drum and hat assembly 600, in accordance herewith, is depicted. The floating brake drum and hat assembly 600 includes a brake drum 612 having a braking surface 614 and an attachment flange 616. Floating brake drum and hat assembly 600 also includes a hat 618 having an outer diameter 620 and a brake drum mounting flange 622 for mounting to attachment flange 616 of brake drum 612. As detailed above, brake drum 612 may be made of cast iron, as those skilled in the art will recognize. For example, a suitable material would be Class 35 cast iron, which has a tensile strength of about 35 ksi and a yield strength of about 28 ksi. Hat 618 can be made of cast iron, like the brake drum 612, or if desired, a material having a lower hardness, such as aluminum, may be used.

To form floating brake drum and hat assembly 600, means for coupling the attachment flange of the brake drum to the brake drum mounting flange of the hat 624 are provided. As shown, brake drum mounting flange 622 of hat 618 includes a plurality of hat tabs 636. In some embodiments, each hat tab 636 includes a flange projection 652 extending in an axial direction and in a radial direction so as to form a plurality of flange projections 652 adapted to receive a snap ring 654. Attachment flange 616 of brake drum 612 is provided with a plurality of brake drum tabs 538 for engagement with the hat tabs 636. In the embodiment depicted in FIGS. 13A-C and 14, means for coupling 624 includes snap ring 654 for engaging the plurality of flange projections 652 and forming the assembly 600. As shown in FIGS. 13A-C and 14, each flange projection 652 extends in an axial direction at the circumferential edge of each hat tab 636 and in a radially outward direction, providing an annular aperture, adapted for radially inward and axial-directed constrained seating of snap ring 654. In some embodiments, at least one pin 660 for securing the snap ring 654 to the hat 618 may be provided. In some embodiments, snap ring 654 is configured in the form of a multiple turn spiral ring. As may be appreciated, this form enables the snap ring 654 to be made so that its two ends are not adjacent each other, making for a more secure engagement.

As will be appreciated by those skilled in the art, upon a review of FIGS. 13A-C and 14 and the discussion below, means for coupling 624 is structured and arranged to allow for radial thermal expansion and contraction of at least a portion of the attachment flange 616 of the brake drum 612 and/or at least a portion of the brake drum mounting flange 622 of the hat 618.

While not shown in the embodiment depicted in FIGS. 13A-C and 14, brake drum tabs 638 may be provided with a tapered surface. This serves to preload brake drum tabs 638 against snap ring 654, reducing unwanted noise and chatter associated with a looser fit.

In another form, a method of making a floating brake drum and hat assembly is provided. The method includes the steps of providing a brake drum having a braking surface and an attachment flange; providing a hat having an outer diameter and a brake drum mounting flange for mounting to the attachment flange of the brake drum; and coupling the attachment flange of the brake drum to the brake drum mounting flange of the hat by providing a means for coupling structured and arranged to allow radial thermal expansion and contraction of at least a portion of the attachment flange of the brake drum and/or at least a portion of the brake drum mounting flange of the hat.

In operation, brake shoes, not shown, are selectively pressed against the braking surface of brake drum to slow or stop rotation of brake drum, and thus slow or stop rotation of the wheel hat and vehicle wheel.

This invention offers the advantage of a lower brake drum failure rate and accommodates thermal expansion of the brake drum. In some embodiments disclosed herein, rattling is eliminated.

While the information below is for a hub and drum assembly, nevertheless it may be seen that this invention yields outstanding weight reduction, resulting in the ability to carry larger loads and/or improve fuel economy.

| Hub/16.5 × 7.5 Drum | No. | Floating Brake Drum | | Conventional Brake Drum | |
|---|---|---|---|---|---|
| | | Wt. (lbs.) | Wt. (lbs.) | Wt. (lbs.) | Wt. (lbs.) |
| Hub | 1 | 34.00 | 34.00 | 32.5 | 32.5 |
| Drum | 1 | 79.00 | 79.00 | 102.0 | 102.0 |
| Wheel Bearing | 2 | 4.51 | 9.02 | 4.51 | 9.02 |
| Wheel Bearing Outer Race | 2 | 1.65 | 3.30 | 1.65 | 3.30 |
| Axle Seal | 1 | 0.41 | 0.41 | 0.41 | 0.41 |
| Wheel Studs | 10 | 1.00 | 10.00 | 1.00 | 10.0 |
| Tone Ring Bolts | 0 | 0.00 | 0.00 | 0.00 | 0.00 |
| Tone Ring | 1 | 0.76 | 0.76 | | |
| Stainless Abutment Clips | 20 | 0.12 | 2.40 | | |
| Drum Retaining Ring | 1 | 0.24 | 0.24 | | |
| Hub/Drum Total | | | 139.13 | | 157.23 |
| Total Weight Savings: | | | 18.10 | | |

The drum brake and hat assemblies disclosed herein can be used on automobiles, light-duty trucks, classes 4, 5, 6, 7, and 8 trucks, off road vehicles, such as all terrain vehicles, and earth moving equipment. In short, the invention can be applied to any motorized vehicle. It is further contemplated that this invention can be used in a railway environment on railcars.

INDUSTRIAL APPLICABILITY

The components, assemblies, systems and methods disclosed herein are applicable to the motor vehicle industry.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

Illustrative, non-exclusive examples of components, assemblies, systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A floating brake drum and hat assembly comprising a brake drum having a braking surface and an attachment flange; a hat having an outer diameter and a brake drum mounting flange for mounting to the attachment flange of the brake drum; and means for coupling the attachment flange of the brake drum to the brake drum mounting flange of the hat, the means for coupling structured and arranged to allow radial thermal expansion and contraction of at least a portion of the attachment flange of the brake drum and/or at least a portion of the brake drum mounting flange of the hat.

A2. The assembly of paragraph A1, wherein the brake drum mounting flange of the hat comprises a plurality of threaded brake drum mounting studs and the attachment flange of the brake drum comprises a plurality of corresponding holes.

A3. The assembly of paragraph A2, wherein the means for coupling comprises a plurality of threaded nuts for threading onto the threaded brake drum mounting studs and forming the assembly.

A4. The assembly of paragraph A2, wherein the brake drum attachment flange is scalloped to reduce material and provide space for thermal expansion.

A5. The assembly of paragraph A2, wherein the outer diameter of the hat is sized to provide space for thermal expansion.

A6. The assembly of paragraph A2, further comprising a plurality of grommets for mounting within the holes the attachment flange of the brake drum, the plurality of grommets are structured and arranged to provide a degree of thermal isolation between the attachment flange of the brake drum and the brake drum mounting flange of the hat.

A7. The assembly of paragraph A6, wherein the plurality of grommets are structured and arranged to provide additional space for thermal expansion of the attachment flange of the brake drum.

A8. The assembly of paragraph A1, wherein the attachment flange of the brake drum has a plurality of brake drum tabs.

A9. The assembly of paragraph A8, wherein the brake drum mounting flange of the hat comprises a plurality of hat tabs for engagement with the brake drum tabs.

A10. The assembly of paragraph A9, wherein each of the plurality of hat tabs of the brake drum mounting flange further comprises a threaded hold-down ring mounting stud.

A11. The assembly of paragraph A10, wherein the means for coupling comprises a hold-down ring, the hold-down ring having a plurality of holes to correspond with the threaded hold-down ring mounting studs and a plurality of threaded nuts for threading onto the threaded hold-down ring mounting studs and forming the assembly.

A12. The assembly of paragraph A11, wherein the means for coupling further comprises a plurality of spacers for placing over the threaded hold-down ring mounting studs and under the hold-down ring to isolate the brake drum tabs from the hold-down ring.

A13. The assembly of paragraph A11, wherein the means for coupling further comprises a plurality of biasing members for placing onto the brake drum tabs and under the hold-down ring to preload the brake drum tabs.

A14. The assembly of paragraph A9, wherein each of the plurality of hat tabs of the brake drum mounting flange further comprises an unthreaded hold-down ring mounting stud.

A15. The assembly of paragraph A14, wherein the means for coupling comprises a hold-down ring, the hold-down ring having a plurality of holes to correspond with the unthreaded hold-down ring mounting studs and a plurality of lock rings for engaging grooves on the unthreaded hold-down ring mounting studs and forming the assembly.

A16. The assembly of paragraph A15, wherein the means for coupling further comprises a plurality of spacers for placing over the unthreaded hold-down ring mounting studs and under the hold-down ring to isolate the brake drum tabs from the hold-down ring.

A17. The assembly of paragraph A15, wherein the means for coupling further comprises a plurality of biasing members for placing onto the brake drum tabs and under the hold-down ring to preload the brake drum tabs.

A18. The assembly of paragraph A9, wherein each of the plurality of hat tabs of the brake drum mounting flange further comprises a flange projection extending in an axial direction and in a radial direction so as to form a plurality of flange projections adapted to receive a snap ring.

A19. The assembly of paragraph A18, wherein the means for coupling comprises a snap ring.

A20. The assembly of paragraph A19, wherein the snap ring is in the form of a multiple turn spiral ring.

A21. The assembly of paragraph A19, wherein each flange projection extends in an axial direction at the circumferential edge of hat tab and in a radially inward direction, providing an annular aperture, adapted for radially outward and axial-directed constrained seating of the snap ring.

A22. The assembly of paragraph A19, wherein each flange projection extends in an axial direction at the circumferential edge of hat tab and in a radially outward direction, providing an annular aperture, adapted for radially inward and axial-directed constrained seating of the snap ring.

A23. The assembly of paragraph A22, further comprising at least one pin for securing the snap ring to the hat.

B1. A method of making a floating brake drum and hat assembly comprising providing a brake drum having a braking surface and an attachment flange; providing a hat having an outer diameter and a brake drum mounting flange for mounting to the attachment flange of the brake drum; and coupling the attachment flange of the brake drum to the brake drum mounting flange of the hat by providing a means for coupling structured and arranged to allow radial thermal expansion and contraction of at least a portion of the attachment flange of the brake drum and/or at least a portion of the brake drum mounting flange of the hat.

B2. The method of paragraph B1, wherein the brake drum mounting flange of the hat comprises a plurality of threaded brake drum mounting studs and the attachment flange of the brake drum comprises a plurality of corresponding holes.

B3. The method of paragraph B2, wherein the means for coupling comprises a plurality of threaded nuts for threading onto the threaded brake drum mounting studs and forming the assembly.

B4. The method of paragraph B2, wherein the brake drum attachment flange is scalloped to reduce material and provide space for thermal expansion.

B5. The method of paragraph B2, wherein the outer diameter of the hat is sized to provide space for thermal expansion.

B6. The method of paragraph claim B2, wherein the means for coupling further comprises a plurality of grommets for mounting within the holes the attachment flange of the brake drum, the plurality of grommets are structured and arranged to provide a degree of thermal isolation between the attachment flange of the brake drum and the brake drum mounting flange of the hat.

B7. The method of paragraph B6, wherein the plurality of grommets are structured and arranged to provide additional space for thermal expansion of the attachment flange of the brake drum.

B8. The method of paragraph B1, wherein the attachment flange of the brake drum has a plurality of brake drum tabs.

B9. The method of paragraph B8, wherein the brake drum mounting flange of the hat comprises a plurality of hat tabs for engagement with the brake drum tabs.

B10. The method of paragraph B9, wherein each of the plurality of hat tabs of the brake drum mounting flange further comprises a threaded hold-down ring mounting stud.

B11. The method of paragraph B10, wherein the means for coupling comprises a hold-down ring, the hold-down ring having a plurality of holes to correspond with the threaded hold-down ring mounting studs and a plurality of threaded nuts for threading onto the threaded hold-down ring mounting studs and forming the assembly.

B12. The method of paragraph B11, wherein the means for coupling further comprises a plurality of spacers for placing over the threaded hold-down ring mounting studs and under the hold-down ring to isolate the brake drum tabs from the hold-down ring.

B13. The method of paragraph B11, wherein the means for coupling further comprises a plurality of biasing members for placing onto the brake drum tabs and under the hold-down ring to preload the brake drum tabs.

B14. The method of paragraph B9, wherein each of the plurality of hat tabs of the brake drum mounting flange further comprises an unthreaded hold-down ring mounting stud.

B15. The method of paragraph B14, wherein the means for coupling comprises a hold-down ring, the hold-down ring having a plurality of holes to correspond with the unthreaded hold-down ring mounting studs and a plurality of lock rings for engaging grooves on the unthreaded hold-down ring mounting studs and forming the assembly.

B16. The method of paragraph B15, wherein the means for coupling further comprises a plurality of spacers for placing over the unthreaded hold-down ring mounting studs and under the hold-down ring to isolate the brake drum tabs from the hold-down ring.

B17. The method of paragraph B15, wherein the means for coupling further comprises a plurality of biasing members for placing onto the brake drum tabs and under the hold-down ring to preload the brake drum tabs.

B18. The method of paragraph B9, wherein each of the plurality of hat tabs of the brake drum mounting flange further comprises a flange projection extending in an axial direction and in a radial direction so as to form a plurality of flange projections adapted to receive a snap ring.

B19. The method of paragraph B18, wherein the means for coupling comprises a snap ring.

B20. The method of paragraph B19, wherein the snap ring is in the form of a multiple turn spiral ring.

B21. The method of paragraph B19, wherein each flange projection extends in an axial direction at the circumferential edge of hat tab and in a radially inward direction, providing an annular aperture, adapted for radially outward and axial-directed constrained seating of the snap ring.

B22. The method of paragraph B19, wherein each flange projection extends in an axial direction at the circumferential edge of hat tab and in a radially outward direction, providing an annular aperture, adapted for radially inward and axial-directed constrained seating of the snap ring.

B23. The method of paragraph B22, wherein the means for coupling further comprises at least one pin for securing the snap ring to the hat.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A floating brake drum and hat assembly comprising:
a brake drum having a braking surface and an attachment flange;
a hat having an outer diameter and a brake drum mounting flange for mounting to the attachment flange of the brake drum; and
means for coupling the attachment flange of the brake drum into contact with the brake drum mounting flange of the hat, the means for coupling structured and arranged to allow radial thermal expansion and contraction of at least a portion of the attachment flange of the brake drum and/or at least a portion of the brake drum mounting flange of the hat,
wherein the outer diameter of the hat is sized to provide space for thermal expansion.

2. The assembly of claim 1, wherein the brake drum mounting flange of the hat comprises a plurality of threaded brake drum mounting studs and the attachment flange of the brake drum comprises a plurality of corresponding holes.

3. The assembly of claim 2, wherein the means for coupling comprises a plurality of threaded nuts for threading onto the threaded brake drum mounting studs and forming the assembly.

4. The assembly of claim 2, wherein the brake drum attachment flange is scalloped to reduce material and provide space for thermal expansion.

5. The assembly of claim 2, further comprising a plurality of grommets for mounting within the holes the attachment flange of the brake drum, the plurality of grommets are structured and arranged to provide a degree of thermal isolation between the attachment flange of the brake drum and the brake drum mounting flange of the hat.

6. The assembly of claim 5, wherein the plurality of grommets are structured and arranged to provide additional space for thermal expansion of the attachment flange of the brake drum.

7. The assembly of claim 1, wherein the attachment flange of the brake drum has a plurality of brake drum tabs.

8. The assembly of claim 7, wherein the brake drum mounting flange of the hat comprises a plurality of hat tabs for engagement with the brake drum tabs.

9. The assembly of claim 8, wherein each of the plurality of hat tabs of the brake drum mounting flange further comprises a threaded hold-down ring mounting stud.

10. The assembly of claim 9, wherein the means for coupling comprises a hold-down ring, the hold-down ring having a plurality of holes to correspond with the threaded hold-down ring mounting studs and a plurality of threaded nuts for threading onto the threaded hold-down ring mounting studs and forming the assembly.

11. The assembly of claim 10, wherein the means for coupling further comprises a plurality of spacers for placing over the threaded hold-down ring mounting studs and under the hold-down ring to isolate the brake drum tabs from the hold-down ring.

12. The assembly of claim 10, wherein the means for coupling further comprises a plurality of biasing members for placing onto the brake drum tabs and under the hold-down ring to preload the brake drum tabs.

13. The assembly of claim 8, wherein each of the plurality of hat tabs of the brake drum mounting flange further comprises an unthreaded hold-down ring mounting stud.

14. The assembly of claim 13, wherein the means for coupling comprises a hold-down ring, the hold-down ring having a plurality of holes to correspond with the unthreaded hold-down ring mounting studs and a plurality of lock rings for engaging grooves on the unthreaded hold-down ring mounting studs and forming the assembly.

15. The assembly of claim 14, wherein the means for coupling further comprises a plurality of spacers for placing over the unthreaded hold-down ring mounting studs and under the hold-down ring to isolate the brake drum tabs from the hold-down ring.

16. The assembly of claim 14, wherein the means for coupling further comprises a plurality of biasing members for placing onto the brake drum tabs and under the hold-down ring to preload the brake drum tabs.

17. The assembly of claim 8, wherein each of the plurality of hat tabs of the brake drum mounting flange further comprises a flange projection extending in an axial direction and in a radial direction so as to form a plurality of flange projections adapted to receive a snap ring.

18. The assembly of claim 17, wherein the means for coupling comprises the snap ring.

19. The assembly of claim 18, wherein the snap ring is in the form of a multiple turn spiral ring.

20. The assembly of claim 18, wherein each flange projection extends in an axial direction at the circumferential edge of hat tab and in a radially inward direction, providing an annular aperture, adapted for radially outward and axial-directed constrained seating of the snap ring.

21. The assembly of claim 18, wherein each flange projection extends in an axial direction at the circumferential edge of hat tab and in a radially outward direction, providing an annular aperture, adapted for radially inward and axial-directed constrained seating of the snap ring.

22. The assembly of claim 21, further comprising at least one pin for securing the snap ring to the hat.

23. A method of making a floating brake drum and hat assembly comprising:

providing a brake drum having a braking surface and an attachment flange;

providing a hat having an outer diameter and a brake drum mounting flange for mounting to the attachment flange of the brake drum; and coupling the attachment flange of the brake drum into contact with the brake drum mounting flange of the hat by providing a means for coupling structured and arranged to allow radial thermal expansion and contraction of at least a portion of the attachment flange of the brake drum and/or at least a portion of the brake drum mounting flange of the hat, wherein the outer diameter of the hat is sized to provide space for thermal expansion.

* * * * *